US010313385B2

(12) United States Patent
Shakarian et al.

(10) Patent No.: US 10,313,385 B2
(45) Date of Patent: Jun. 4, 2019

(54) SYSTEMS AND METHODS FOR DATA DRIVEN GAME THEORETIC CYBER THREAT MITIGATION

(71) Applicant: ARIZONA BOARD OF REGENTS ON BEHALF OF ARIZONA STATE UNIVERSITY, Tempe, AZ (US)

(72) Inventors: Paulo Shakarian, Chandler, AZ (US); John Robertson, Prescott, AZ (US); Jana Shakarian, Chandler, AZ (US); Vivin Paliath, Chandler, AZ (US); Amanda Thart, Scottsdale, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 220 days.

(21) Appl. No.: 15/362,730

(22) Filed: Nov. 28, 2016

(65) Prior Publication Data

US 2017/0155677 A1    Jun. 1, 2017

Related U.S. Application Data

(60) Provisional application No. 62/261,200, filed on Nov. 30, 2015.

(51) Int. Cl.
*H04L 29/06* (2006.01)
*G06Q 30/02* (2012.01)

(52) U.S. Cl.
CPC ..... *H04L 63/1433* (2013.01); *G06Q 30/0201* (2013.01); *H04L 63/1441* (2013.01)

(58) Field of Classification Search
None
See application file for complete search history.

(56) References Cited

U.S. PATENT DOCUMENTS

| 8,413,238 | B1 | 4/2013 | Sutton |
| 8,863,293 | B2 | 10/2014 | Christoderscu et al. |
| 2004/0088565 | A1* | 5/2004 | Norman ............. H04L 63/1433 726/22 |
| 2013/0198848 | A1* | 8/2013 | Wolff .................... G06F 21/568 726/25 |
| 2014/0137257 | A1* | 5/2014 | Martinez ............ H04L 63/1433 726/25 |
| 2015/0215332 | A1 | 7/2015 | Curcic |

OTHER PUBLICATIONS

Frei et al., "International Vulnerability Purchase Program", NSS Labs, Dec. 2013 (Year: 2013).*
Ashot Abrahamyan, Application of Stackelberg Security Games in Information Security, 9th Annual Symposium on Information Assurance (Asia '14), Jun. 3-4, 2014, Albany, NY, pp. 62-65.
Lillian Ablon, Martin C. Libicki, Andrea A. Golay, Markets for Cybercrime Tools and Stolen Data: Hackers' Bazaar, 2014, National Security Research Division, RAND Corporation.
(Continued)

*Primary Examiner* — Henry Tsang
(74) *Attorney, Agent, or Firm* — Polsinelli PC

(57) ABSTRACT

System and methods for a data-driven security game framework that models an attacker based on exploit market data actively mined from the darknet to develop strategies for the defender are disclosed.

17 Claims, 9 Drawing Sheets

(56) References Cited

OTHER PUBLICATIONS

Yossi Azar, Iftah Gamzu, Efficient Submodular Function Maximization Under Linear Packing Constraints, in Automata, Languages, and Programming, 39th International Colloquium, ICALP 2012, pp. 38-50, Springer.
Hsinchun Chen, Dark Web: Exploring and Data Mining the Dark Side of the Web, vol. 30, 2012, Springer Science and Business Media.
Uriel Feige, A Threshold of in n for Approximating Set Cover, Journal of the ACM, Jul. 1998, vol. 45, No. 4, pp. 634-652.
Christopher Kiekintveld, Viliam Lisy, Radek Píbil, Game-theoretic Foundations for the Strategic Use of Honeypots in Network Security, in Cyber Warfare—Building the Scientific Foundation, 2015, vol. 56, pp. 81-101, Springer.
Weifeng Li, Hsinchun Chen, Identifying Top Sellers in Underground Economy Using Deep Learning-Based Sentiment Analysis, Joint Intelligence and Security Informatics Conference, 2014, pp. 64-67, Institute of Electrical and Electronics Engineers Inc.
G.L. Nemhauser, L.A. Wolsey, An Analysis of Approximations for Maximizing Submodular Set Functions—I, Mathematical Programming, 1978, vol. 14, pp. 265-294, North-Holland Publishing Company.
Kien C. Nguyen, Tansu Alpcan, and Tamer Basar, Stochastic Games for Security in Networks with Interdependent Nodes, International Conference on Game Theory for Networks, 2009, pp. 697-703, IEEE.
Kyle Soska, Nicolas Christin, Measuring the Longitudinal Evolution of the Online Anonymous Marketplace Ecosystem, in the Proceedings of the 24th USENIX Security Symposium, Aug. 14-15, 2015, pp. 33-48, USENIX Association.
Ziming Zhao, Gail-Joon Ahn, Hongxin Hu, Deepinder Mahi, Social Impact: Systematic Analysis of Underground Social Dynamics, in Computer Security—ESORICS 2012, 2012, Sara Foresti, Moti Yung, Fabio Martinelli, eds., pp. 877-894, Springer.
Kong-Wei Lye, Jeanette M Wing, Strategies in Network Security, International Journal of Information Security, 2005, vol. 4, No. 1, pp. 71-86, Springer-Verlag 2005.
Jure Leskovec, Andrea Krause, Carlos Guestrin, Christos Faloutsos, Jeanna Vanbriesen, Natalie Glance, Cost-Effective Outbreak Detection in Networks, In Proceedings of the 13th ACM SIGKDD International conference on Knowledge discovery and data mining, 2007, pp. 420-429, ACM.
John Robertson, Vivin Paliath, Jana Shakarian, Amanda Thart, Paulo Shakarian, Data Driven Game Theoretic Cyber Threat Mitigation, in Proceedings of the Twenty-Eighth AAAI Conference on Innovative Application (IAAI6), 2016, pp. 4041-4046, Association for the Advancement of Artificial Intelligence.
P. Shakarian, Stuxnet: Cyberwar Revolution in Military Affairs, Small Wars Journal, 2011, Small Wars Foundation.
Shakarian, Lei, Lindelauf, Power Grid Defense Against Malicious Cascading Failure, in Proceedings of the 13th International Conference on Autonomous Agents and Multiagent Systems (AAMAS 2014), 2014, pp. 813-820, International Foundation for Autonomous Agents and Multiagent Systems.
Devon Callahan, Paulo Shakarian, Jeffrey Nielson, Anthony N. Johnson, Shaping Operations to Attack Robust Terror Networks, Socialinformatics, 2014.
Paulo Shakarian, Austin Parker, Gerardo Simari, and Venkatramana (V. S.) Subrahmanian, Annotated Probabilistic Temporal Logic. ACM Transactions on Computational Logic, 2011, vol. 12, No. 2, Art. 14.

\* cited by examiner

SYSTEMS AND METHODS FOR DATA DRIVEN GAME THEORETIC CYBER THREAT MITIGATION

CROSS REFERENCE TO RELATED APPLICATIONS

This is a non-provisional application that claims benefit to U.S. provisional application Ser. No. 62/261,200 filed on Nov. 30, 2015, which is herein incorporated by reference in its entirety.

FIELD

The present disclosure relates to a security game framework, and in particular to a data-driven security game framework that models an attacker based on exploit market data actively mined from the "darknet" or other overlay communication networks to develop strategies for the defender.

BACKGROUND

Many corporations rely on extensive penetration testing to assess the security of their computer networks. In a penetration test, a red team is hired to expose major flaws in the firm's security infrastructure. Recently, however, the market for exploit kits has continued to evolve and what was once a rather hard-to-penetrate and exclusive market—whose buyers were primarily western governments—has now become more accessible to a much wider population. Specifically, the darknet or other overlay network portions of the Internet accessible through anonymization protocols (such as Tor and i2p) have become populated with a variety of markets specializing in such products. In particular, 2015 saw the introduction of darknet markets specializing in zero-day exploit kits—exploits designed to leverage previously undiscovered vulnerabilities. These exploit kits are difficult and time-consuming to develop—and often are sold at premium prices. A survey of 8 marketplaces shows the price ranges of exploit kits for common software in Table 1—these prices range from 0.0126-8.4 Bit-coin (2.88-1919.06 U.S. dollars at the time of this writing).

The widespread availability of zero-day exploits in the darknet represents a potential game changer for penetration testers—specifically posing the following questions:

What exploits will an attacker likely purchase if he targets my organization?

What software used in the organization pose the biggest risk to new threats?

Unfortunately, the high cost of a variety of exploits available through the darknet may preclude a penetration tester from obtaining such exploits at a reasonable price to perform an effective penetration testing that accurately accesses the security of a computer network being tested. While criminal activity on the darknet has been extensively studied over the past decade for issues such as drug trade and terrorism, the markets for exploits existing on the darknet are much less well-understood.

TABLE 1

Example of Products offered on Darknet Markets

| Product | Price in BTC | Price in $* |
| --- | --- | --- |
| GovRAT (Source Code + 1 Code Signing Certificate Included) | 2.000 | $456.92 |
| 0 day Wordpress MU Remote Shell | 1.500 | $342.69 |
| A5/1 Encryption Rainbow Tables | 1.500 | $342.69 |
| Unlimited Code Signing Certificate | 1.200 | $274.16 |
| Ready-made Linux botnet 600 SERVERS | 1.200 | $274.16 |
| FUD version of Adobe Flash <=16.0.0.287 (CVE 2015-0311) | 1414.68 | $600.00 |

*Price in U.S. Dollar as of Sep. 1, 2015 [1 BTC = $228.46]

There has been related work on malicious hacker forums which did not focus on the purchase and sale of specific items. Markets of malicious products relevant to cyber security have been previously studied, but none of these works gathered data on specific exploits (or other products) from either the darkweb or open Internet; nor did they examine the markets through the lens of security games.

In recent years, "security games" where attacker-defender models are used to inform the actions of defenders in military, law-enforcement, and homeland security applications have gained much traction. With regard to cybersecurity, there have been many contributions including intrusion detection, attack graph based games, and honeypot placement. However, there does not appear to be a game theoretic approach to host-based defense where the activities of the attacker are informed from an "un-conventional" source (information not directly related to the defender's system)—specifically information from darknet markets in this case. Further, the very recent emergence of darknet markets specializing in zero-day exploits allow for the integration of information that was previously unknown.

BRIEF DESCRIPTION OF THE DRAWINGS

Corresponding reference characters indicate corresponding elements among the view of the drawings. The headings used in the figures do not limit the scope of the claims.

DETAILED DESCRIPTION

Given a system configuration (or a distribution of system configurations within an organization), the present disclosure models an attacker who, given a budget, will purchase exploits to maximize his level of access to the target system. Likewise, a defender will look to adjust system configurations in an effort to minimize the effectiveness of an attacker while ensuring that necessary software dependencies are satisfied.

Figure 1:
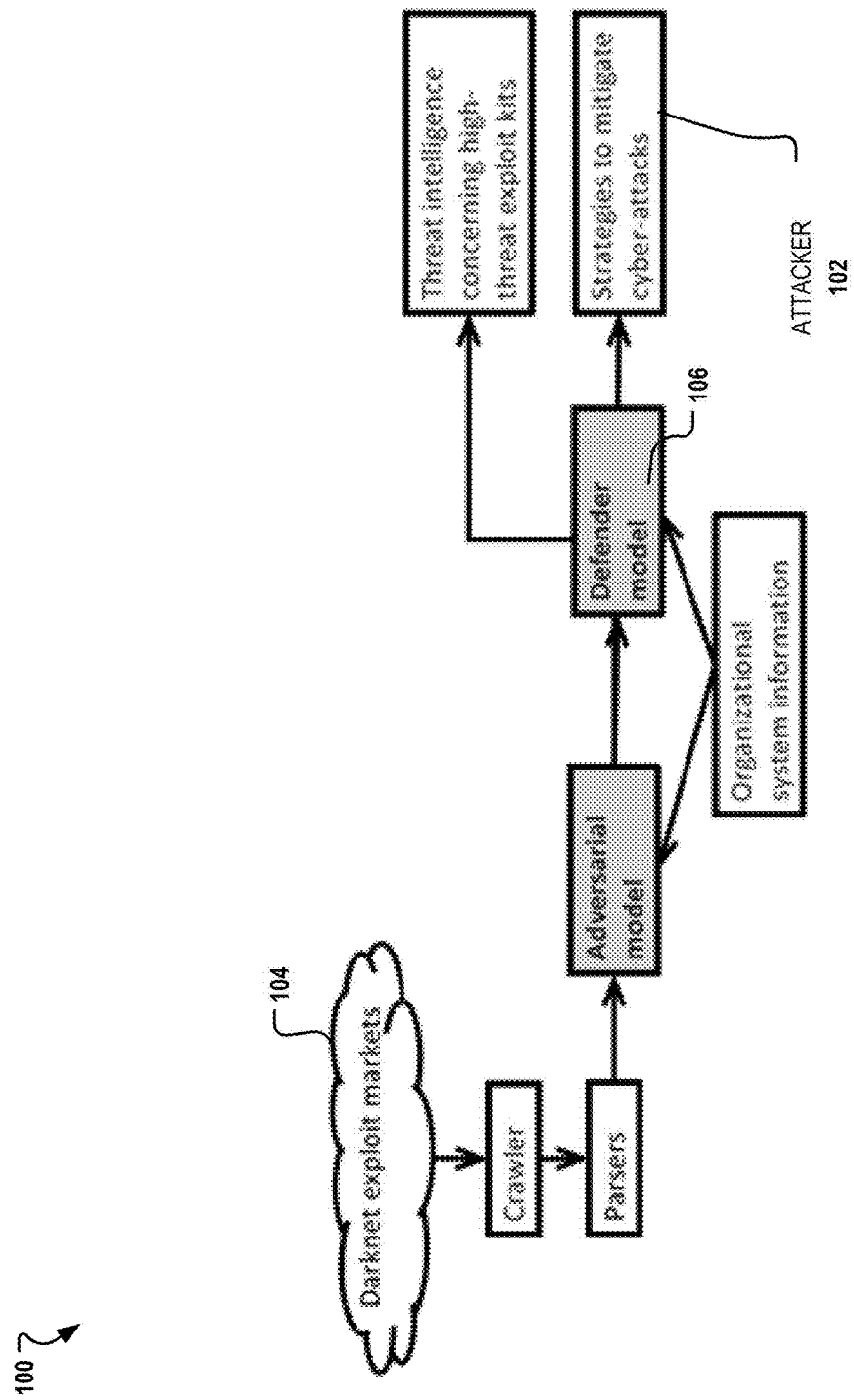
FIG. 1 is a schematic of a real-time exploit analysis system.

The present system introduces a rigorous and thoroughly analyzed framework for addressing penetration testing that is fed with real-world exploit market data, mined from the darknet. FIG. 1 provides a schematic diagram 100 of our framework. In one embodiment, a new security game framework 100 is designed to model an attacker with access to exploit markets and a defender of information technology infrastructure; theoretical analysis of the framework leading to the development of algorithms to find near-optimal strategies for both players; and an implementation of the system and the results of a thorough suite of experiments on real-world data.

In some embodiments, the framework 100 includes a security game where the attacker 102 is a malicious hacker with access to a darknet exploit markets 104 and the defender 106 is tasked with host-based defense of either a single or group of systems. The notation V is used herein to represent the entire set of vulnerabilities within a given computer system. Though there may be vulnerabilities not yet detected by the system administrator, information on new vulnerabilities can be mined through an examination of darknet hacking markets. In a real-world organization, system administrators are not able to patch all vulnerabilities for a variety of reasons. Software dependencies, use of legacy systems, and non-availability of patches are some examples. To model this, a "constraint set" (denoted C) is defined as a subset of V. The vulnerabilities in a constraint set represent the vulnerabilities required for some system functionality. When each vulnerability in a constraint set C is in the presented attack surface (i.e. externally accessible), C is then said to be satisfied and the system supports the functionality modeled by C.

In particular, let $\mathcal{C}$ represent the set of all possible constraint sets. This idea is extended with an "application constraint set" which, for an arbitrary application, i, denoted $C_i$, is a set of constraint sets (i.e. $C_i \subseteq \mathcal{C}$). Each constraint set in $C_i$ represents a set of vulnerabilities that together will provide complete functionality of application i. $C_i$ is said to be satisfied if any single constraint set in $C_i$ is satisfied. If $C_i$ is satisfied by a system configuration, and hence at least one constraint set in $C_i$ is satisfied, application i will properly operate on the system. C is the set of all application constraint sets for a given system configuration and represents all of the applications to be run on the system. So, in this framework, for a given system, a system administrator selects which vulnerabilities may be present in order to allow each application i to function. This begs the question as to how to make this selection. As such, the process is begun by defining some concepts relevant to the adversary.

The term ex is used to denote a particular exploit—a technique used to take advantage of a given vulnerability. Let Ex denote the set of all possible exploits and $\mathbb{E}x$ denote the set of all possible exploit sets (i.e. $\mathbb{E}x=2^{Ex}$). For each ex $\in$ Ex, $C_{ex}$ is the associated cost of exploit ex—and this is specified directly on a darknet market 104 (normally in Bitcoin). Associated with the set of exploits is the Exploit Function, ExF, which takes a set of exploits as input and returns a set of vulnerabilities (i.e. ExF: Ex$\rightarrow 2^V$). The set of vulnerabilities produced by ExF(A), for a given set of exploits A, represents the vulnerabilities that are exploited by the exploits in A. While many possible variations of an exploit function are possible, in this paper, we will use a straightforward definition that extends the exploit function from singletons (whose associated vulnerabilities can be taken directly from the online marketplaces) to sets of exploits: $ExF(A) = \bigcup_{a \in A} ExF(\{a\})$. For use in proving complexity results, we shall denote the special case where Ex=V, ExF(A)=A, and $\forall ex \in Ex$, $c_{ex}=1$ as the "Identity Exploit Model".

Player Strategies and Payoff.

An attacker 102 will use a set of exploits to attempt to gain access to a system, and will do so within a budget. Likewise, the defender 106 identifies a set of vulnerabilities that he is willing to expose (often referred to as the "presented attack surface"). Strategies for the two players formally defined as follows.

Definition 2.1. (Attack Strategy). Given budget $k_{atk} \in \mathbb{R}^+$, an Attack Strategy, denoted A is a subset of Ex s.t. $\Sigma_{a \in A} C_a \leq k_{atk}$.

Definition 2.2. (Defense Strategy). Given a family of application constraint sets $\mathbf{C}=\{C_O, C_1, \ldots C_n\}$, a Defense Strategy, denoted D is a subset of V s.t. for each $C_i \in \mathbf{C}$, there exists $C \in C_i$ where $C \subseteq D$.

Note that when a defense strategy D meets the requirements of C, as per Definition 2.2, we say D satisfies C. We will use the notation $\mathbb{A}$, $\mathbb{D}$ to denote the set of all attack and defense strategies, respectively, and refer to an attacker-defender pair of strategies as a "strategy profile." We will also define a mixed strategy for both players in the normal manner. For the attacker (resp. defender) a mixed strategy is a probability distribution over $\mathbb{A}$ (resp. $\mathbb{D}$). Mixed strategies as $Pr_A$, $Pr_D$ are normally denoted for each player and use the notation $|Pr_A|$ (resp. $|Pr_D|$) to denote the number of strategies in $\mathbb{A}$ (resp. $\mathbb{D}$) that are assigned a nonzero probability by the mixed strategy. The payoff function may be defined formally as follows:

Definition 2.3. (Payoff Function). A payoff function, p, is any function that takes a strategy profile as an argument and returns a positive real. Formally, p: $\mathbb{A} \times \mathbb{D} \theta \mathbb{R}^+$ Unless noted otherwise, the payoff function will be treated as being computable in polynomial time. Also, the payoff function is underspecified—which is designed to allow flexibility in the framework. The following "payoff function axioms" are contemplated:

$$\forall D \in \mathbb{D}, \forall A \in \mathbb{A} \text{ s.t. } ExF(A) \cap D = \emptyset, p(A,D)=0 \quad (1)$$

$$\forall D \in \mathbb{D}, \forall D' \subseteq D, \forall A \in \mathbb{A}, p(A,D') \leq p(A,D) \quad (2)$$

$$\forall D \in \mathbb{D}, \forall A \in \mathbb{A}, \forall A' \subseteq A, p(A',D) \leq p(A,D) \quad (3)$$

$$\forall A \in \mathbb{A}, D, D' \in \mathbb{D}, p(A,D)+p(A,D') \geq p(A,D \cup D') \quad (4)$$

$$\forall D \in \mathbb{D}, A, A' \in \mathbb{A}, p(A,D)+p(A',D) \geq p(A \cup A',D) \quad (5)$$

Axiom 1 states that if the vulnerabilities generated by an attack strategy's exploits and the vulnerabilities in a defense strategy are disjoint sets, the payoff function must return 0. A consequence of axiom 1 is that if either the attack strategy or the defense strategy is the empty set, the payoff function will return 0. Axioms 2 and 3 require the payoff function to be monotonic in the size of the attack and $_{defense}$ strategies. Axioms 4 and 5 require the payoff function to be submodular with respect to the attack and defense strategies.

The present disclosure focuses on the "over-lap payoff function" which is defined as follows: $p(A,D)=|ExF(A) \cap D|$. Intuitively, this is simply the number of vulnerabilities exploited by the attacker. Further, when dealing with mixed strategies, payoff in terms of expectation will be discussed. Expected payoff can be formally defined as follows:

$$\text{Exp}(Pr_A, Pr_D) = \sum_{D \in \mathcal{D}} \sum_{A \in \mathcal{A}} Pr_A(A) Pr_D(D) p(A, D)$$

Using the overlap function, the expected payoff can be interpreted as the "expected number of exploited vulnerabilities."

Best Response Problems.

A pair of decision problems dealing with the best response for the players will now be described below. These problems are the deterministic host attacker problem (DHAP) and deterministic host defender problem (DHDP), respectively, and are defined as follows:

DHAP.

INPUT: $k_{atk} \in \mathbb{R}^+$, $x \in \mathbb{R}^+$, mixed defense strategy $Pr_D$, and payoff function p.

OUTPUT: "Yes" if $\exists \forall \in A$ s.t. $\Sigma_{a \in A} c_a \leq k_{atk}$ and $\Sigma_{D \in \mathcal{D}} Pr_D(D) P(A, D) \geq x$, "No" otherwise.

DHDP.

INPUT: $x \in \mathbb{R}^+$, application constraints C, mixed attack strategy $Pr_A$, and payoff function p.

OUTPUT: "Yes" if $\exists D \in \mathcal{D}$ s.t. $\Sigma_{A \in \mathcal{A}} Pr_A(A) p(A, D) \leq x$ and D satisfies C, and "No" otherwise.

The natural optimization variants for these two problems will deal with maximizing the payoff in DHAP and minimizing the payoff in DHDP.

Analysis and Algorithms

The complexity and limits of approximation for both DHAP and DHDP will now be analyzed. The "Identity Exploit Model" is used for the complexity results. Unfortunately, both problems are NP-Complete in the general case.

Theorem 1. DHAP is NP-Complete, even when $|Pr_D|$ and the payoff function adheres to the submodularity and monotonicity axioms.

Proof Sketch.

Membership in NP is trivial if the payoff is PTIME computable. The hardness result relies on an embedding of the well-known budgeted set cover. Here, the defender's strategy is treated as a set of elements to cover and the exploits are treated as subsets of D (by virtue of the exploit function). Exploit costs are set as 1 and the attacker's budget is the value budget from the embedded problem. So, the attacker must pick exploits to meet the budget and cover the determined number of the defender's vulnerabilities.0

Theorem 2. When $|C|>1$ and $|Pr_A|=1$, DHDP is NP-Complete.

Proof Sketch.

Again, membership in NP is trivial if the payoff is PTIME computable. Hardness is shown by embedding the hitting set problem. In this reduction, the attacker plays all exploits and each exploit corresponds with precisely one vulnerability. This has the effect of imposing a unit cost on each vulnerability. Here, each $C_i$ must be covered by a vulnerability. Hence, the defender must pick a set of all vulnerabilities to meet the cost requirement of DHDP while covering each $C_i$.

The hardness of approximation is also analyzed for the optimization variants of DHAP and DHDP. Due to the fact that the above embeddings used set cover and hitting set, we can draw upon the known past results to obtain the following corollaries:

Corollary 3. DHAP cannot be approximated where the payoff is within a factor of $$\left(1 - \frac{1}{n}\right)$$

unless P=NP

Corollary 4. DHDP cannot be approximated where the payoff is within a factor of $(1-o(1))\ln(n)$ unless P=NP With the limits of approximation in mind, several algorithms are introduced to solve the optimization variants of DHAP and DHDP. The optimization variant of DHAP under the overlap payoff function is a special case of sub-modular maximization with the distinction that we are not simply picking k discrete objects, but instead picking items that each have a unique cost associated with them. Understanding this, several different approaches are examined to this problem based on the literature on submodular maximization. DHDP, on the other hand, can be readily approximated using the traditional set-cover algorithm (under some realistic assumptions), as cost does not affect DHDP.

---

Algorithm 1 Lazy Greedy Algorithm (Cost-Benefit Variant)

Input: $k_{atk} \in \mathbb{R}^+$, $Pr_D$, and payoff function p.
Output: $A \subseteq$ Ex such that $\Sigma_{a \in A} c_a \leq k_{atk}$
1:    $A \leftarrow \emptyset$; cost $\leftarrow 0$; priority queue $Q \leftarrow \emptyset$; iter $\leftarrow 1$
2:    for e ∈ Ex do
3:    
$$e.key \leftarrow \frac{\Delta_{p,Pr_D}(e \mid \emptyset)}{c_e}; e.i \leftarrow 1$$

4:        Insert e into Q with e.key as its key
5:    end for
6:    while $\{a \in Ex \backslash A : c_a + \text{cost} \leq k_{atk}\} \neq \emptyset$ do
7:        extract top (max) element e of Q
8:        if e.i = iter and $c_e$ + cost ≤ $k_{atk}$ then
9:            $A \leftarrow A \cup \{e\}$; iter $\leftarrow$ iter + 1
10:       cost $\leftarrow$ cost + $c_e$
11:       else if $c_e$ + cost ≤ $k_{atk}$ then
12:
$$e.i \leftarrow \text{iter}; e.key \leftarrow \frac{\Delta_{p,Pr_D}(e \mid A)}{c_e};$$

13:           re-insert e into Q
14:       end if
15:    end while
16:    return A

---

Algorithms for DHAP

Greedy Approaches.

As mentioned earlier, the non-unit cost of exploits mean that DHAP can be considered as a submodular maximization problem subject to knapsack constraints. Two versions of the traditional greedy algorithm can be applied: a cost-benefit variant and uniform-cost variant, both of which will also use the lazy-greedy optimization to further enhance performance while maintaining the approximation guarantee. It was independently noted that the uniform-cost and the cost-benefit algorithms can perform arbitrarily badly. However, by extending a result from either the cost-benefit or the uniform-cost algorithm will provide a solution within a factor of $\frac{1}{2}(1-1/e)$ for a given set of input parameters. By applying both algorithms to a given problem instance and returning the attack strategy which produces the larger payoff, the $\frac{1}{2}(1-1/e)$ approximation factor is achieved for DHAP. A cost-benefit lazy approximation algorithm is shown in Algorithm 1. By removing "ce" from the denominator in the e.key assignment in lines 3 and 12, the cost benefit lazy approximation algorithm is transformed into a uniform cost lazy approximation algorithm.

Multiplicative Update Approach.

An improved approximation ratio, when compared with the $\frac{1}{2}(1-1/e)$ ratio for the greedy algorithms, can be obtained by adapting Algorithm 1 for DHAP. This is shown as Algorithm 2 in this disclosure. For some value e (a parameter), this algorithm provides a $(1-\epsilon(1-1/e))$ approximation of the optimal solution (Theorem 1.2), which, by providing an exceedingly small $\epsilon$ value, can get arbitrarily close to the $\frac{1}{2}(1-1/e)$ optimal approximation limit we discussed earlier.

---

Algorithm 2 Multiplicative Update

Input: $k_{atk}$, $\epsilon \in \mathbb{R}^+$ such that $0 < \epsilon < 1$, $Pr_D$, and payoff function p.
Output: $A \subseteq Ex$ s.t. $\Sigma_{a \in A} c_a \leq k_{atk}$
1:   $Ex' \leftarrow \{ex \in Ex : c_{ex} \leq k_{atk}\}$
2:   $A \leftarrow \emptyset$
3:   $W \leftarrow \min_{ex_i' \in Ex'} k_{atk}^2/c_{ex_i'}$ 4:   $w \leftarrow \dfrac{1}{k_{atk}}; \lambda \leftarrow e^{\frac{\epsilon W}{4}}$ 5:   while $k_{atk}w \leq \lambda$ and $Ex' \neq \emptyset$ do 6:   $$ex_j \leftarrow \operatorname{argmin}_{ex_j \in Ex' \setminus A}\left(\dfrac{c_{ex_j}}{k_{atk}}w/\Delta_{p,Pr_D}(ex_j \mid A)\right)$$

7:   $A \leftarrow A \cup \{ex_j\}$
8:   $w \leftarrow w\lambda^{c_{ex_j}/k_{atk}}$
9:   $Ex' \leftarrow Ex' \setminus \{ex_j\}$
10:  end while
11:  if $\Sigma_{A_i \in A} c_{A_i} \leq k_{atk}$ then
12:     return A
13:  else if $\Sigma_{D \in Pr_D} Pr_D(D)p(A \setminus \{ex_j\},D) \geq \Sigma_{D \in Pr_D} Pr_D(D)p(\{ex_j\},D)$ then
14:     return $A \setminus \{ex_j\}$
15:  else
16:     return $\{ex_j\}$
17:  end if

---

Algorithm for DHDP. When using the overlap payoff function, DHDP can be modeled as a weighted set cover problem. Because the overlap payoff function is a modular function, the associated cost of a given vulnerability v, is simply the payoff produced by the singleton set $\{v\}$ with a mixed attack strategy. In the common case where each constraint set is a singleton set, if the overlap payoff function is used, an adaptation on the standard greedy weighted set cover algorithm can be used for DHDP (Algorithm 3), providing a $\ln(n)+1$ approximation, Evaluation and Discussion Darknet Market Data.

Eight marketplaces located on the Tor network were scraped and parsed during the month of May 2015. Each of these markets host vendors offering "hacking tools", including malware, botnets, exploits and other means serving to breach, steal and otherwise manipulate virtual targets. The product list is comprised of 235 such hacking tools, 167 of which were distinct.

---

Algorithm 3 Weighted Greedy DHDP Algorithm for
Singleton Constraint Set and Overlap Payoff Function Case Input: Vulnerabilities V, $Pr_A$, and application constraints C
Output: $D \subseteq V$ s.t. the application constraints C are satisfied
1:   $D \leftarrow \emptyset$
2:   $S \leftarrow$ set such that $S_i = \{j : V_i \in C_j$ where $V_i$ is the ith vulnerability in V$\}$
3:   $c_{S_i} \leftarrow \Sigma_{A \in Pr_A} Pr_A(A) |ExF(A) \cap \{V_i\}|$
4:   $C' \leftarrow [|C|]$
5:   while $C' \neq \emptyset$ do 6:   $$S_i \leftarrow \operatorname{argmax}_{S_i \in S} \dfrac{|s_i \cap c'|}{c_{S_i}}$$

---

Algorithm 3 Weighted Greedy DHDP Algorithm for
Singleton Constraint Set and Overlap Payoff Function Case 7:       $C' \leftarrow C' \setminus S_i$
8:       $D \leftarrow D \cup \{V_i\}$
9:   end while
10:  return D

---

Figure 2:
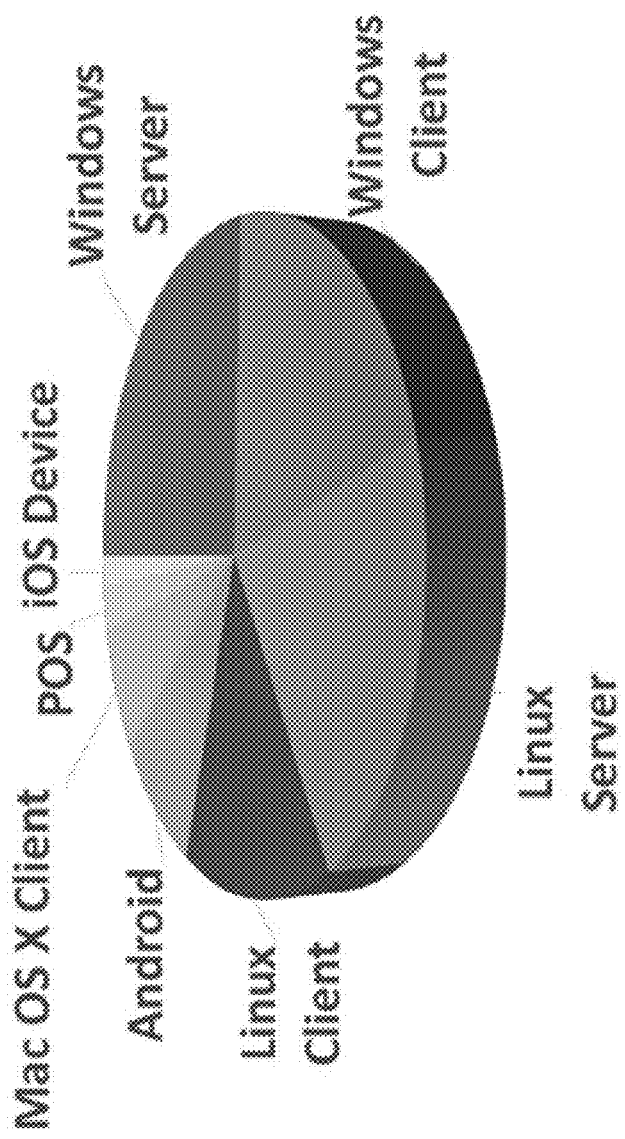
FIG. 2 is a graph showing the distribution of Exploits with respect to platform.

It found several identical products being sold on more than one market usually by the same seller (using an identical online handle). The products targeted 21 specific platforms, such as different versions of Adobe Flash, Linux, MSWindows and OS X as well as online presences such as Facebook, Wordpress and others. Hardware-related software such as those associated with Point-of-Sale machines, routers, and servers are also reflected in this number. FIG. 2 illustrates the variety of products in the markets and Table 2 illustrates exemplar exploits.

System Configurations.

As noted in FIG. 2, a variety of platforms were represented in our darknet market data. Results are described using application constraints based on common configurations for Windows and Linux servers—as these were the most prominent targets of exploits found on the darknet. In our experiments, software was mapped such as media players, databases, and FTP server software to application constraint sets to model the functional requirements of a system. Experiments were conducted with models for Android, Point-of-Sale, and Apple systems—though qualitatively the results differed little from the Windows and Linux Server experiments.

DHAP Results.

Figure 3A:
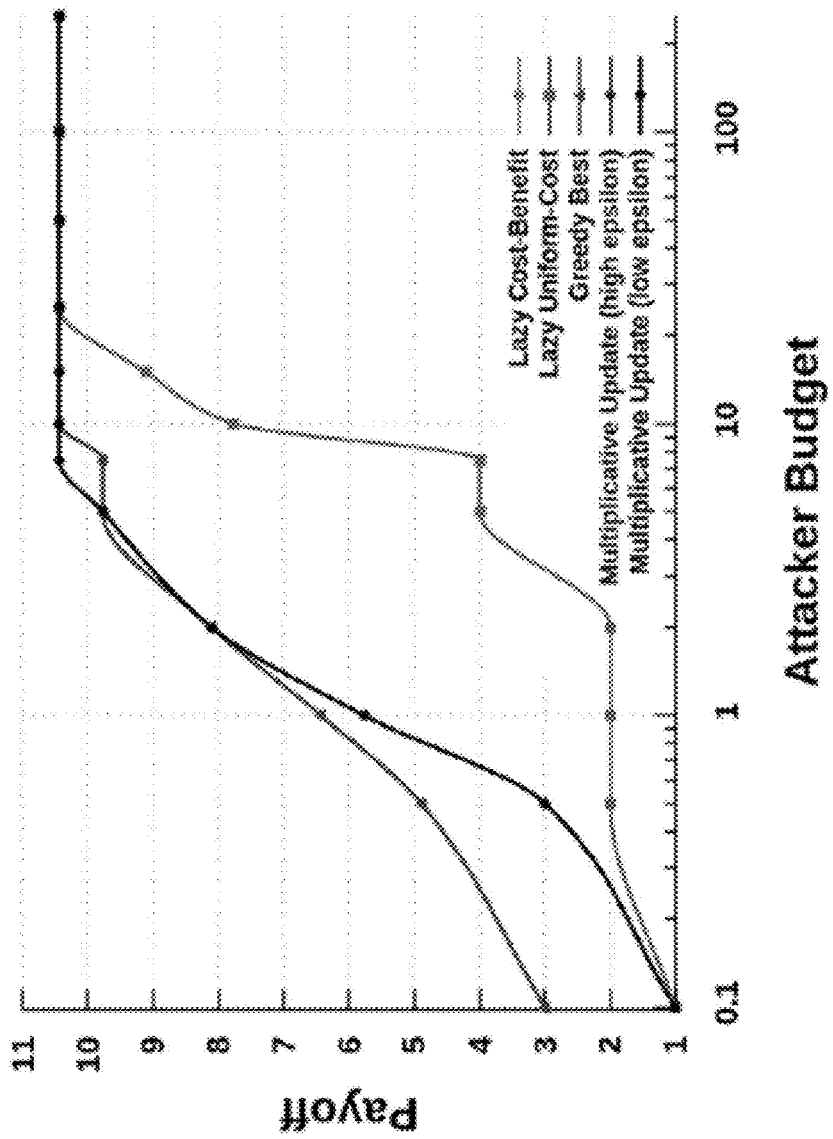
FIG. 3A is a graph showing DHAP Payoff vs. Budget for a Windows server
Figure 3B:
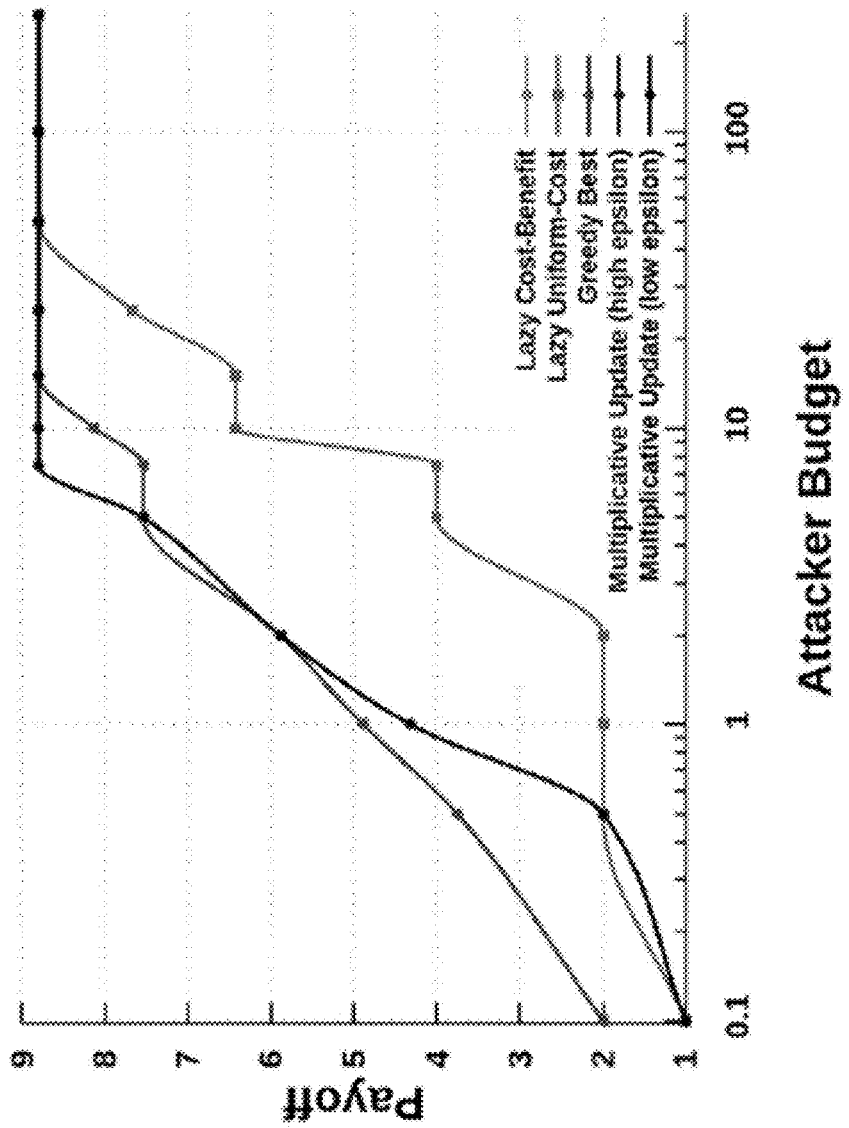
FIG. 3B is a graph showing the DHAP Payoff vs. Budget for a Linux server.

Both the greedy and multiplicative update approaches were implemented to address the DHAP problem. For the greedy algorithm, three variants of greedy (cost-benefit, uniform cost, and combination of the two) were studied while we varied the parameter $\epsilon$ for the multiplicative update approach. Attacker payoff was examined as a function of budget (in Bitcoin). FIGS. 3A and 3B display this result. Though the cost-benefit greedy algorithm has the potential to perform poorly, it was, in general, the best performing approach—despite the multiplicative update approach achieving the better approximation guarantee. Further, the multiplicative update algorithm (Algorithm 2) was consistently the slowest in terms of runtime, taking much longer than the lazy greedy algorithms, particularly for high values of $k_{atk}$. Despite the multiplicative update algorithm having a better theoretical approximation ratio when compared to the tandem of greedy algorithms, namely $(1-\epsilon)(1-1/e)$ compared to $\frac{1}{2}(1-1/e)$, as shown in FIGS. 3A and 3B that the greedy algorithms performed as good as or better than the multiplicative update very consistently. In all algorithms, as expected, runtime grew with budget (not pictured)—though the relationship was not strict, as an increase in budget does not necessarily mean that more exploits will be selected. In the experiments (on a commodity computer equipped with a 3.49 GHz i7 CPU and 16 GB of memory), the runtimes never exceeded ten minutes.

DHDP Results.

Figure 4A:
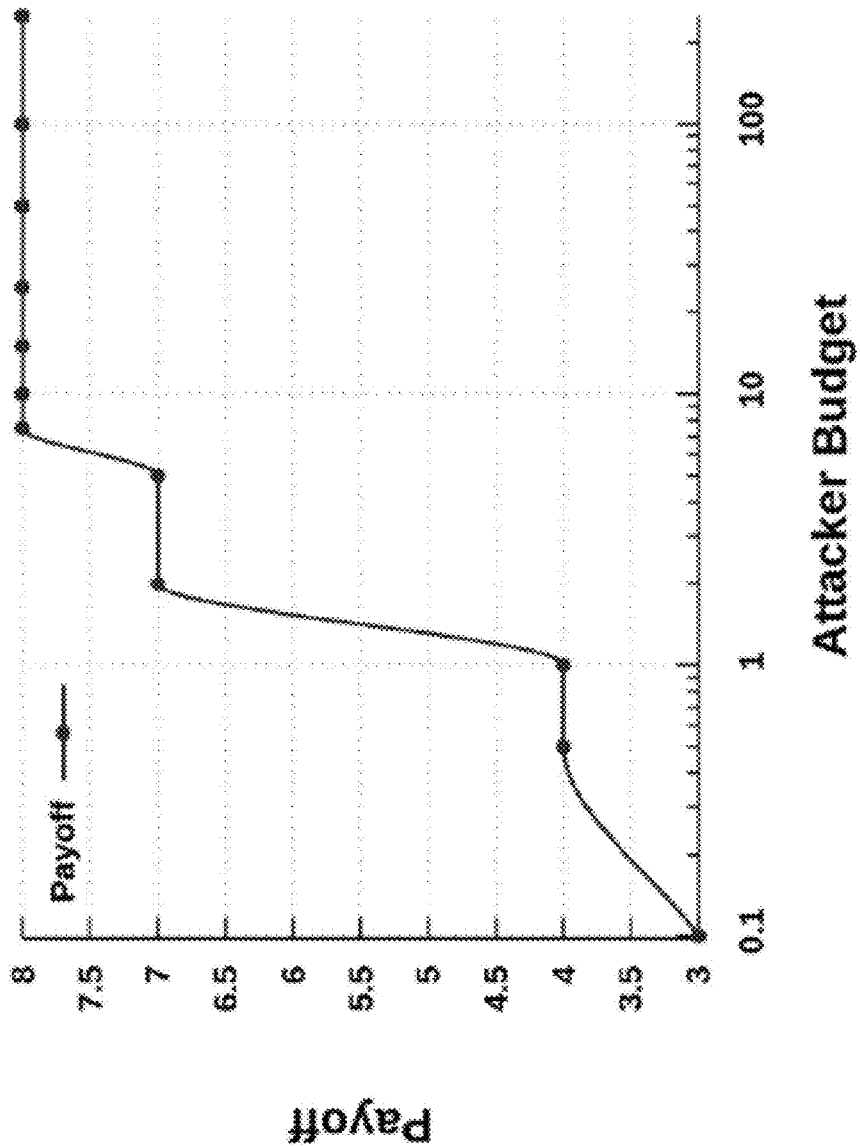
FIG. 4A is a graph showing Defender Best Response, Payoff vs. $k_{atk}$ for Windows server
Figure 4B:
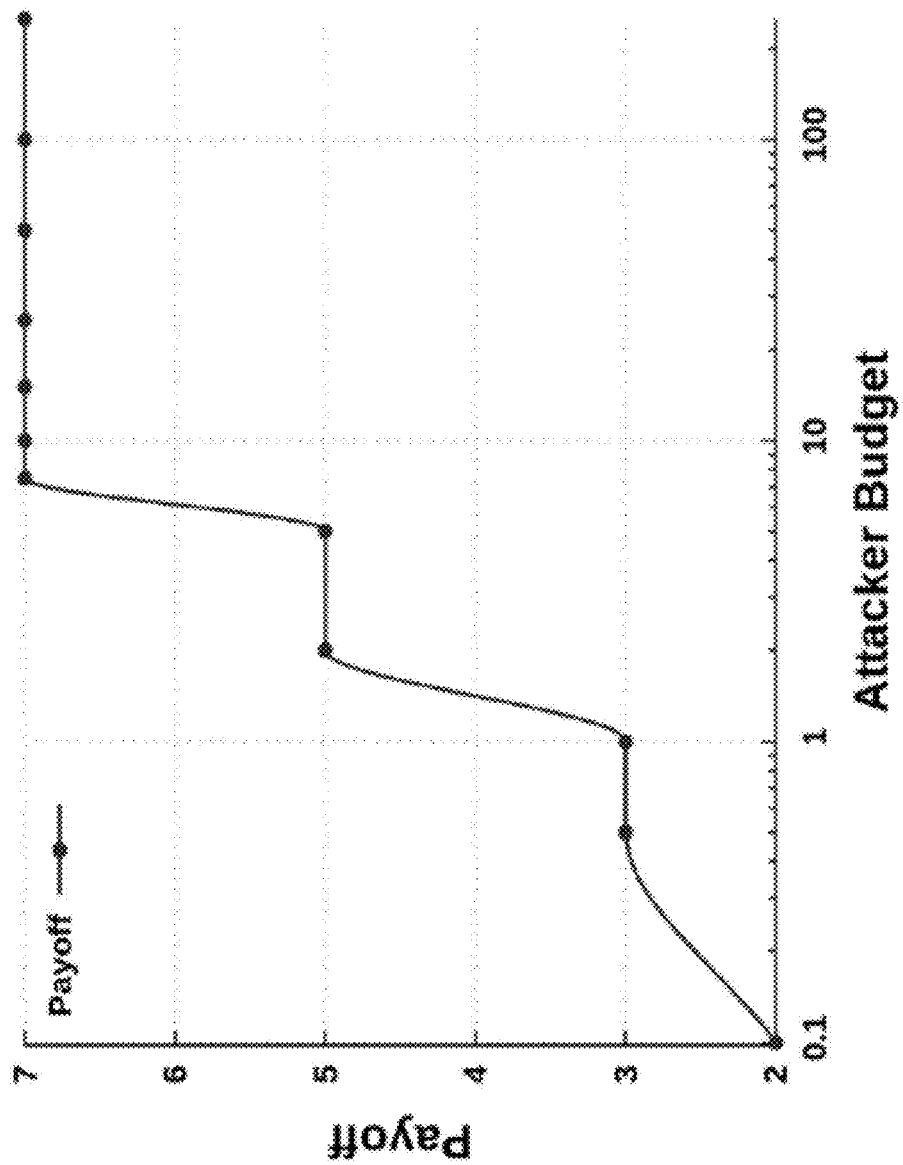
FIG. 4B is a graph showing Defender Best Response, Payoff vs. $k_{atk}$ for Linux server.

FIGS. 4A and 4B demonstrate a defender's best response to an attack strategy against a Windows Server and Linux Server, respectively, for varying values of $k_{atk}$. Though similar trends are shown in FIGS. 3A and 3B as are shown in FIGS. 4A and 4B, the payoff is generally lower, meaning that the defender can lower the expected payoff by enacting a best response strategy to an attack strategy produced by DHAP—which in the framework translates to fewer exploited vulnerabilities.

Exploit Payoff Analysis.

Instead of altering the software that appears on the host system in an attempt to avoid exploits, such as in the best response approach, in exploit payoff analysis, the defender will identify which specific exploits are increasing the payoff the most, with a hope that the defender can reverse-engineer the exploit, or patch the vulnerability himself. To identify which exploits should be reverse-engineered, the defender first runs DHAP against his host system to identify what payoff an attacker could expect to produce. Then, for each exploit ex, the defender runs DHAP against the host with the set of exploits Ex|{ex}. The exploit ex that, when removed from the universe of exploits Ex, produces the largest drop in payoff for the attacker is the exploit that the defender should attempt to reverse-engineer. More formally, let A be the attack strategy produced by DHAP when using Ex as the universe of exploits and let $A_{ex}$ be the attack strategy that is produced when DHAP is run against the host when using Ex|{ex} as the universe of exploits. The defender will attempt to reverse-engineer the exploit, where D is the defense strategy representing the host. To account for exploits that, though they greatly reduce payoff when removed from Ex, may be too expensive for the defender to purchase, a cost-benefit analysis is also considered where the decrease in payoff is normalized by the cost of the exploit. The top exploits to reverse-engineer to defend a Windows Server host when considering an attacker budget of $k_{atk}=5$, are shown in Table 3 with columns for both maximum payoff reduction and maximum cost-benefit analysis.

TABLE 2

Examples of Exploits from Darknet Markets

| Prod. | Vuln. | Target | USD |
|---|---|---|---|
| Kernel Panic | X-display system | Linux < = 3.13.0-48 | $ 471.56 |
| IE < = 11 | memory corr. | IE on Windows < = 7 | $ 36.00 |
| RemoteShell | wpconfig.php | Wordpress MU | $1,500.00 |
| 0 day RCE | WebView memory corr. | Android 4.1, 4.2 | $ 36.50 |
| WindowsLPE | Win32k elev. of priv. | Windows < = 8.1 | $12.00-48.17 |
| MS15-034 RCE | http.sys | Windows < = 8.1 | $ 311.07 |
| FUD Flash Exp. | unspec. | FlashPlayer < = 16.0.0.287 | $ 600.00 |

TABLE 3

Defender Exploit Analysis for $k_{atk}=5$

| Exploit | Max. Payoff Reduction | Max. Cost-Benefit | Exploit Cost (BTC) |
|---|---|---|---|
| SMTP Mail Cracker | 1 | 4.757 | 0.2102 |
| SUPEE-5433 | 1 | 1.100 | 0.8404 |
| Hack ICQ | 1 | 79.088 | 0.01264 |
| Plasma | 0.6677 | 1.582 | 0.2563 |
| Wordpress Exploiter | 0.6677 | 2.6467 | 0.2102 |
| CVE-2014-0150 | 0.6677 | 3.178 | 0.2101 |

Game Theoretic Framework

Figure 5:
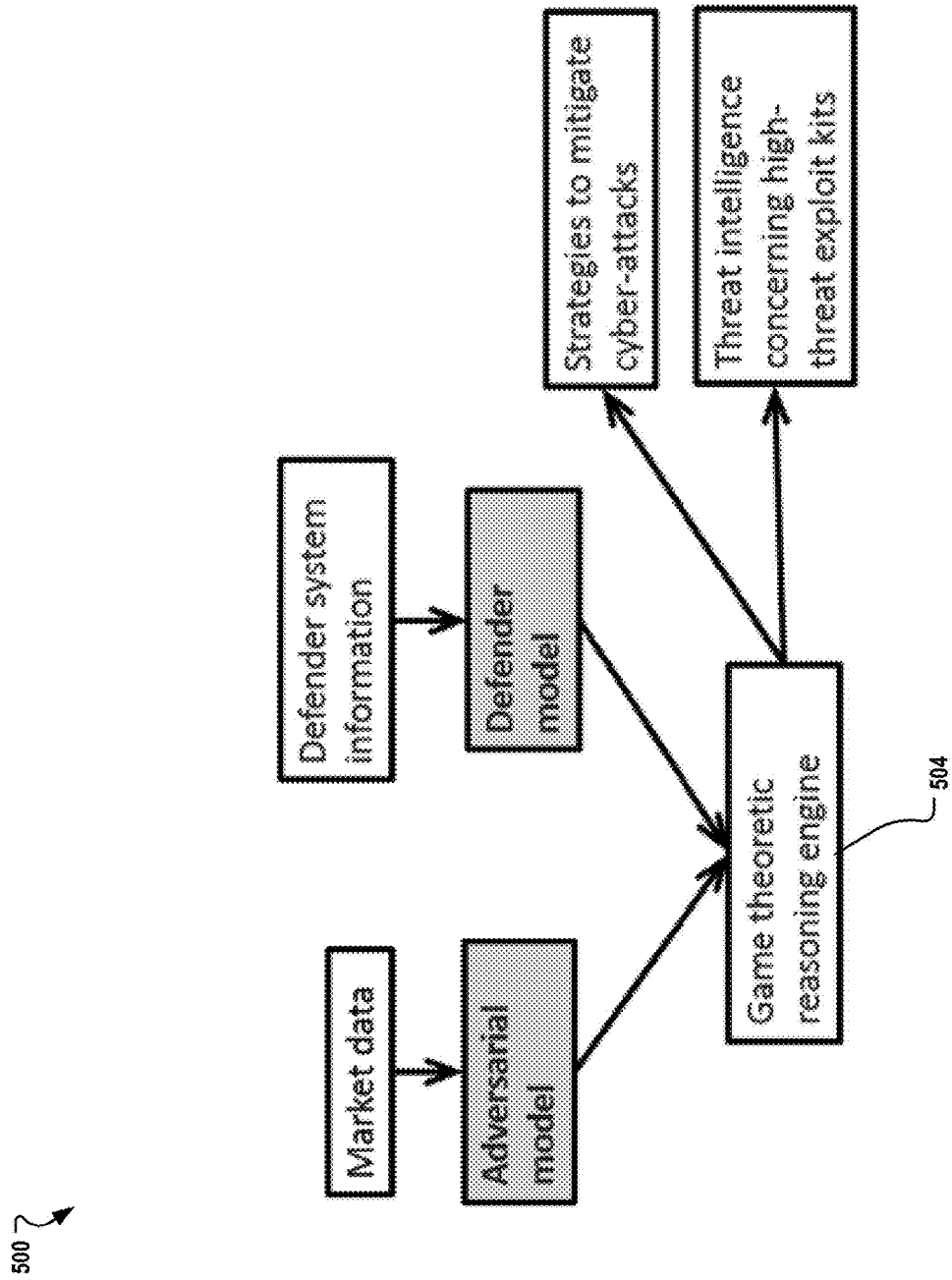
FIG. 5 is a simplified block diagram illustrating one embodiment of a game-theoretic framework.

In some embodiments, to leverage the data collected from the darknet, a game theoretic framework is disclosed to reason about a defender facing an attacker sourced through the communities on the darknet. The paradigm used for this is based on the framework of a "security game". Such a framework 500 is designed from the ground-up to consider marketplace information a simplified block diagram is shown in FIG. 5. In this framework, an attacker has a strategy (denoted A) that consists of a set of exploits he must purchase within a given budget. An exploit function (denoted Ex) maps the attacker's strategy to a set of vulnerable software applications, which can be easily obtained from darknet marketplace data. Meanwhile, the set of applications on a defender's system D is treated as his strategy. While the payoff function is defined in terms of axioms, a simple payoff function can be the cardinality of the overlap—$p(A, D)=|Ex(A) \cap D|$. The NP-hard problems of finding optimal strategies for both players and developed approximation algorithms are disclosed. A mixed strategy of attack and defense is disclosed that provides a natural extension for populations of computer systems as opposed to a single host as well as the modeling of multiple attackers.

Figure 6:
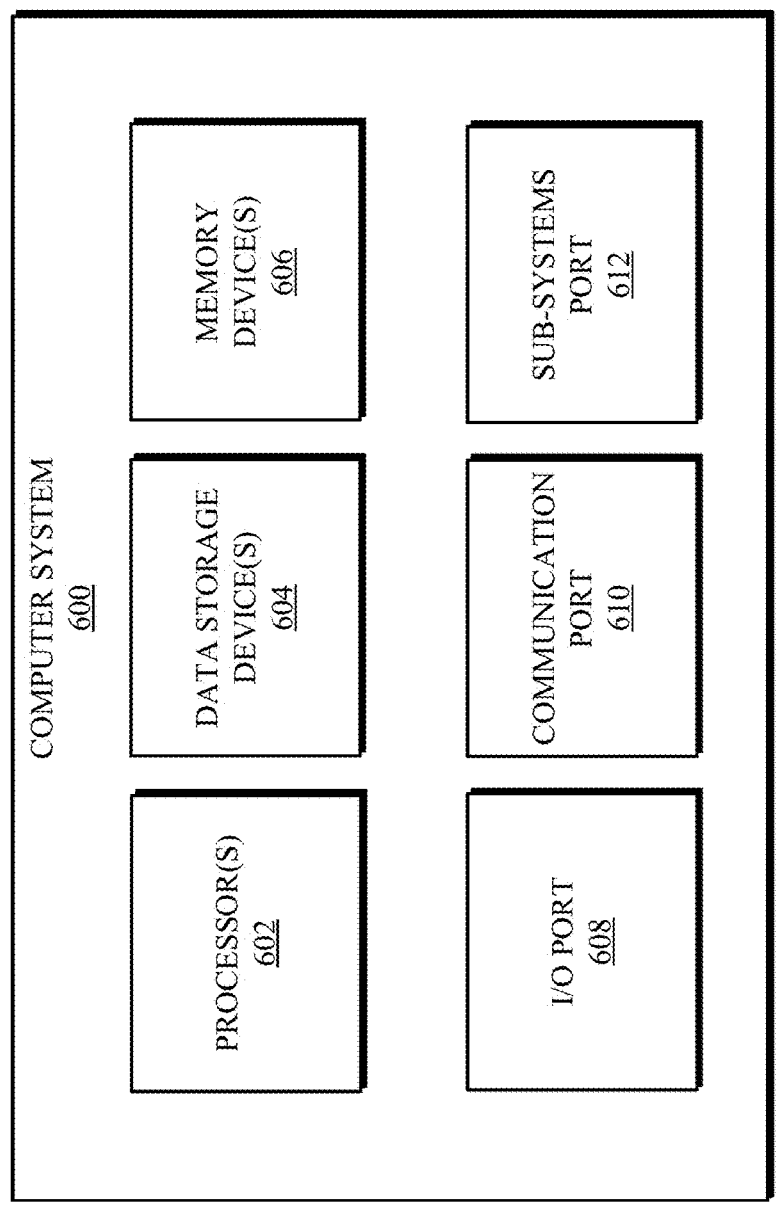
FIG. 6 is a simplified block diagram of a computer system.

Referring to FIG. 6, a detailed description of an example computing system 600 having one or more computing units that may implement various systems and methods discussed herein is provided. The computing system 600 may be applicable to the system described herein. For example, the computing system 600 may form a portion of the theoretical game engine 504 of FIG. 5 discussed above. It will be appreciated that specific implementations of these devices may be of differing possible specific computing architectures not all of which are specifically discussed herein but will be understood by those of ordinary skill in the art.

The computer system 600 may be a computing system is capable of executing a computer program product to execute a computer process. Data and program files may be input to the computer system 600, which reads the files and executes the programs therein. Some of the elements of the computer system 600 are shown in FIG. 6, including one or more hardware processors 602, one or more data storage devices 604, one or more memory devices 606, and/or one or more ports 608-612. Additionally, other elements that will be recognized by those skilled in the art may be included in the computing system 600 but are not explicitly depicted in FIG. 6 or discussed further herein. Various elements of the computer system 600 may communicate with one another by way of one or more communication buses, point-to-point communication paths, or other communication means not explicitly depicted in FIG. 6.

The processor 602 may include, for example, a central processing unit (CPU), a microprocessor, a microcontroller, a digital signal processor (DSP), and/or one or more internal levels of cache. There may be one or more processors 602, such that the processor comprises a single central-processing unit, or a plurality of processing units capable of executing instructions and performing operations in parallel with each other, commonly referred to as a parallel processing environment.

The computer system 600 may be a conventional computer, a distributed computer, or any other type of computer, such as one or more external computers made available via a cloud computing architecture. The presently described technology is optionally implemented in software stored on the data stored device(s) 604, stored on the memory device(s) 606, and/or communicated via one or more of the ports 608-612, thereby transforming the computer system 600 in FIG. 6 to a special purpose machine for implementing the operations described herein. Examples of the computer system 600 include personal computers, terminals, workstations, mobile phones, tablets, laptops, personal computers, multimedia consoles, gaming consoles, set top boxes, and the like.

The one or more data storage devices 604 may include any non-volatile data storage device capable of storing data generated or employed within the computing system 600, such as computer executable instructions for performing a computer process, which may include instructions of both application programs and an operating system (OS) that manages the various components of the computing system 600. The data storage devices 604 may include, without limitation, magnetic disk drives, optical disk drives, solid state drives (SSDs), flash drives, and the like. The data storage devices 604 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 606 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 604 and/or the memory devices 606, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 600 includes one or more ports, such as an input/output (I/O) port 608, a communication port 610, and a sub-systems port 612, for communicating with other computing, network, or vehicle devices. It will be appreciated that the ports 608-612 may be combined or separate and that more or fewer ports may be included in the computer system 600.

The I/O port 608 may be connected to an I/O device, or other device, by which information is input to or output from the computing system 600. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 600 via the I/O port 608. Similarly, the output devices may convert electrical signals received from computing system 600 via the I/O port 608 into signals that may be sensed as output by a human, such as sound, light, and/or touch. The input device may be an alphanumeric input device, including alphanumeric and other keys for communicating information and/or command selections to the processor 602 via the I/O port 608. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

In one implementation, a communication port 610 is connected to a network by way of which the computer system 600 may receive network data useful in executing the methods and systems set out herein as well as transmitting information and network configuration changes determined thereby. Stated differently, the communication port 610 connects the computer system 600 to one or more communication interface devices configured to transmit and/or receive information between the computing system 600 and other devices by way of one or more wired or wireless communication networks or connections. For example, the computer system 600 may be instructed to access information stored in a public network, such as the Internet. The computer 600 may then utilize the communication port to access one or more publicly available servers that store information in the public network. In one particular embodiment, the computer system 600 uses an Internet browser program to access a publicly available website. The website is hosted on one or more storage servers accessible through the public network. Once accessed, data stored on the one or more storage servers may be obtained or retrieved and stored in the memory device(s) 606 of the computer system 600 for use by the various modules and units of the system, as described herein.

Examples of types of networks or connections of the computer system 600 include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 610 to communicate one or more other machines, either directly over a point-to-point communication path, over a wide area network (WAN) (e.g., the Internet), over a local area network (LAN), over a cellular (e.g., third generation (3G) or fourth generation (4G)) network, or over another communication means. Further, the communication port 610 may communicate with an antenna for electromagnetic signal transmission and/or reception.

The computer system 600 may include a sub-systems port 612 for communicating with one or more additional systems to perform the operations described herein. For example, the computer system 600 may communicate through the sub-systems port 612 with a large processing system to perform one or more of the calculations discussed above.

The system set forth in FIG. 6 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

Figure 7:
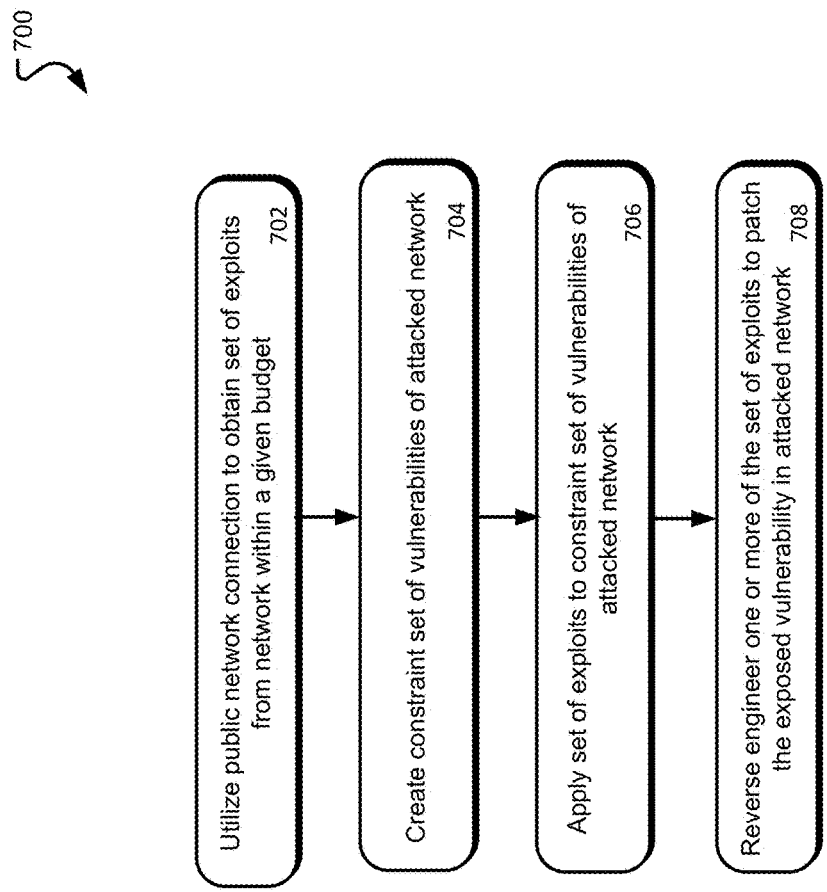
FIG. 7 is a flowchart of a method for applying a game theoretic cyber threat mitigation to a network.

FIG. 7 is a flowchart of a method for applying game theoretic cyber threat mitigation to a network. In one particular embodiment, the operations of the method 700 may be executed by the computing device described above in relation to FIG. 6. Thus, the computing device may utilize a network connection to a public network to obtain a set of exploits to attack a device or network, such as in operation 702. In some instances, the set of exploits may be obtained from the darknet portion of the Internet. In operation 704, the computing device creates a constraint set of vulnerabilities of a network under attack. In general, the constraint set of vulnerabilities includes those vulnerabilities in the attacked device or network that are required for some system functionality. In operation 706, the computing device applies the set of exploits to the constraint set of vulnerabilities of the attacked network to determine a success on attacking the network. In operation 708, the computing device may reverse engineer one or more of the set of exploits applied to the attacked network to develop a patch to the exposed vulnerability to the network.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A system for protecting a computer system from attack, the system comprising:
    a network connection;
    a processing device; and
    a non-transitory computer-readable medium connected to the processing device configured to store instructions that, when executed by the processing device, performs the operations of:
        accessing data through the network connection, the data comprising dark net information associated with exploits of a computer system, comprising:
        obtaining a set of exploits from the dark net information, the set of exploits configured to penetrate the computer system;
        applying an exploit function which takes the set of exploits as input and returns a set of vulnerabilities;
        creating a constraint set of the computer system from the set of vulnerabilities, the constraint set comprising a minimum set of dependencies to operate the computer system;
        applying the set of exploits to the constraint set of the computer system;
        analyzing the application of the set of exploits on the computer system to detect a particular vulnerability of the computer system; and
        altering a configuration of the computer system in response to the analysis of the application of the set of exploits to reduce potential damage of a cyberattack.

2. The system of claim 1, wherein analyzing the application of the set of exploits on the computer system comprises quantifying a risk level posed to the computer system related to a cost to obtain the set of exploits.

3. The system of claim 2, wherein the processing device further performs the operation of:
    aligning Internet data with the constraint set of vulnerabilities based on information obtained about the set of exploits.

4. The system of claim 3, wherein obtaining a set of exploits through the network connection comprises:
    applying one or more algorithms to obtain the set of exploits.

5. The system of claim 4, wherein the one or more algorithms determine the cost to obtain the set of exploits to create a budget and obtains the set of exploits constrained by the determined cost to obtain the set of exploits.

6. The system of claim 5, wherein obtaining the set of exploits is based on maximizing the quantifying of the risk level posed to the computer system related to the cost to obtain the set of exploits.

7. The system of claim 1, wherein altering the configuration of the computer system comprises removing a software component of the computer system that is utilized by the set of exploits to attack the computer system.

8. A method for improving a computing device, the method comprising:
    accessing data comprising dark net information associated with a computer system;
    obtaining a set of exploits from the dark net information, the set of exploits configured to bypass a security feature of the computer system;
    applying an exploit function which takes the set of exploits as input and returns a set of vulnerabilities;
    creating a constraint set of vulnerabilities of the computer system from the set of vulnerabilities comprising a minimum set of dependencies to operate the computer system, wherein application of the set of exploits on the computer system comprises determining the effect of the set of exploits on the constraint set of vulnerabilities of the computer system;
    analyzing an application associated with the set of exploits on the computer system to detect a particular vulnerability of the constraint set of vulnerabilities of the computer system; and
    altering a configuration of the computer system in response to the analysis of the application of the set of exploits to reduce potential damage of a cyberattack.

9. The method of claim 8, wherein analyzing the application of the set of exploits on the computer system comprises quantifying a risk level posed to the computer system related to a cost to obtain the set of exploits.

10. The method of claim 9, wherein obtaining a set of exploits comprises:
    applying one or more algorithms to obtain the set of exploits based on the constraint set of vulnerabilities of the computer system from one or more darknet marketplaces on the Internet.

11. The method of claim 10, wherein the one or more algorithms determine the cost to obtain the set of exploits to create a budget and obtains the set of exploits constrained by the determined cost to obtain the set of exploits.

12. The method of claim 11, wherein obtaining the set of exploits is based on maximizing the quantifying of the risk level posed to the computer system related to the cost to obtain the set of exploits.

13. The method of claim 8, wherein altering the configuration of the computer system comprises removing a software component of the computer system that is utilized by the set of exploits to attack the computer system.

14. The method of claim 8, wherein altering the configuration of the computer system comprises installing a patch to a software component of the computer system that is exposed by the set of exploits to attack the computer system.

15. One or more non-transitory tangible computer-readable storage media storing computer-executable instructions for performing a computer process on a machine, the computer process comprising:

obtaining a set of exploits from dark net information, the set of exploits configured to bypass a security feature of a computer system;

applying an exploit function which takes the set of exploits as input and returns a set of vulnerabilities;

creating a constraint set of vulnerabilities of the computer system from the set of vulnerabilities comprising a minimum set of dependencies to operate the computer system;

applying the set of exploits to the constraint set of vulnerabilities of the computer system;

analyzing the application of the set of exploits on the computer system to detect a particular vulnerability of the computer system; and altering a configuration of the computer system in response to the analysis of the application of the set of exploits to reduce potential damage of a cyberattack.

16. The one or more non-transitory computer-readable storage media of claim 15, wherein analyzing the application of the set of exploits on the computer system comprises quantifying a risk level posed to the computer system related to a cost to obtain the set of exploits.

17. The one or more non-transitory computer-readable storage media of claim 15, wherein obtaining a set of exploits comprises applying one or more algorithms to obtain the set of exploits from one or more darknet marketplaces on the Internet.

* * * * *